Patented Aug. 19, 1947

2,425,991

UNITED STATES PATENT OFFICE 2,425,991

PREPARATION OF DIFLUOROETHANE

Robert E. Burk, Donald D. Coffman, and George H. Kalb, Wilmington, Del., assignors to E. I. du Pont de Nemours & Company, Wilmington, Del., a corporation of Delaware No Drawing. Application December 7, 1945, Serial No. 633,556

7 Claims. (Cl. 260—653)

This invention relates to the preparation of difluoroethane and, more particularly, to an improved process of preparing 1,1-difluoroethane from acetylene and hydrogen fluoride.

Heretofore 1,1-difluoroethane has been synthesized from acetylene and hydrogen fluoride both with the hydrogen fluoride in the vapor phase and in the liquid phase. The vapor phase synthesis has been characterized by limited life of the catalyst used, poor conversions and low space-time yields, and high cost so that the synthesis is not suitable for commercial operation. The liquid phase synthesis, as heretofore proposed, has given low conversions even after long reaction times and it, too, has been found impractical for commercial operation.

An object of the present invention is to provide an improved process of preparing 1,1-difluoroethane from acetylene and hydrogen fluoride. A further object is to provide such a process adapted for commercial operation and characterized by high conversions and space-time yields with complete recovery of the catalyst used. A further object is to provide a process which is readily carried out and free of unusual operational hazards and, in general, well adapted for plant scale operation. Other objects will be apparent from the description of the invention given hereinafter.

The above objects are accomplished according to the present invention by reacting acetylene with hydrogen fluoride in the liquid phase in the presence of catalytic amounts of boron trifluoride under substantially anhydrous conditions. In a more specific form of the invention, the hydrogen fluoride has dissolved therein at least 1%, by weight of the hydrogen fluoride, of boron trifluoride, and preferably around 10%, and the reaction is carried out at a temperature between −20° C. and 50° C. at a pressure from atmospheric up to 200 lbs. per square inch.

Contrary to previous experiences in synthesizing 1,1-difluoroethane, it has been found that quantitative conversions of the reactants and quantitative yields of 1,1-difluoroethane can be readily obtained if acetylene is reacted with hydrogen fluoride in the liquid phase and in the presence of boron trifluoride, and, further, the catalyst may be completely recovered.

The process may be carried out either batch-wise or continuously, the latter being more adapted for large scale production. In carrying out the continuous process, a mixture of gaseous acetylene and boron trifluoride and liquid hydrogen fluoride may be passed through a tubular reactor under pressure or, if the reaction temperature is to be below the boiling point of hydrogen fluoride at atmospheric pressure, a jacketed column fitted with a reflux condenser to return the unreacted vaporized hydrogen fluoride to the reaction zone, may be used and the acetylene simply bubbled through the liquid hydrogen fluoride containing the boron trifluoride at ordinary pressure. Continuous operation with this type of apparatus is accomplished by replacing the hydrogen fluoride as it is consumed and by replacing any hydrogen fluoride and boron trifluoride which may have been carried off in the exit gases. By control of operative conditions 1,1-difluoroethane containing but small amounts of hydrogen fluoride and boron trifluoride, and substantially no unreacted acetylene, may be obtained and from this practically pure 1,1-difluoroethane may be obtained by removing the hydrogen fluoride and boron trifluoride through any expedient such as by absorption with a suitable agent or by scrubbing employing materials capable of dissolving or forming complexes with the two contaminants but not with the 1,1-difluoroethane. Further purification by rectification may be employed but for most purposes purification to this extent is unnecessary.

In the batch-wise method, the reaction may conveniently be carried out under pressure in a pressure vessel. The anhydrous hydrogen fluoride may be forced into the vessel, cooled to the neighborhood of −78° C. with dry ice-acetone, and then the non-condensible gases removed by evacuation. The desired amount of boron trifluoride is admitted and the reactor is permitted to come to a temperature not above 50° C. and preferably near 0° C. Finally, the vessel is pressured with acetylene and repressured as necessary until absorption ceases. It is advantageous to provide some means of mixing the contents either by stirring or by rocking the container. After one to three hours, the reaction is complete and the contents of the vessel may be bled out through agents, such as sodium fluoride or soda-lime, capable of removing hydrogen fluoride and boron trifluoride, and the product is dried and collected by liquefaction by cooling and/or compression. In this procedure an excess of acetylene is employed to maintain the desired pressure so that further purification by rectification or scrubbing with a suitable absorbent for acetylene, such as ammoniacal cuprous chloride, is necessary to obtain 1,1-difluoroethane free of acetylene. The following examples, in which all parts are by weight unless otherwise specified, illustrate specific embodiments of the invention:

Example I

Into a vertical iron pipe packed loosely with steel wool and fitted with a water jacket maintained at 8° C. and a condenser maintained at —20° C., there was charged a previously prepared hydrogen fluoride-boron trifluoride mixture comprising 90 parts of hydrogen fluoride and 10 parts of boron trifluoride (11.1% boron trifluoride). A gaseous mixture of acetylene and boron trifluoride, approximately 3.1:1 weight ratio, under a pressure of about 1 lb. gauge was bubbled in at the bottom of the column at such a rate that the time of contact, defined as the period in which the reactants, hydrogen fluoride and acetylene, and catalyst, boron trifluoride, are in intimate contact in the reaction zone, was 37 seconds. The gases from the condenser were passed over soda-lime to remove hydrogen fluoride and boron trifluoride and the product was collected in a dry ice-acetone cooled trap. By operating in this manner for a period of three hours, 2.4 mols of acetylene gave a quantitative yield of 1,1-difluoroethane, boiling point —27° C. to —25° C.

Example II

The reactor of Example I was charged with a mixture comprising 90 parts of hydrogen fluoride and 10 parts of boron trifluoride (11.1% boron trifluoride), and maintained by suitable refrigeration at —20° C. A mixture of acetylene and boron trifluoride, approximately 3.8:1 weight ratio, under a pressure of about 1 lb. per square inch gauge pressure was bubbled through the mixture at such a rate that the time of contact, as defined in Example I, was 45 seconds. The unreacted hydrogen fluoride and the boron trifluoride were removed with soda-lime and the product was collected in a trap cooled with solid carbon dioxide-acetone mixture. Over a period of 5¼ hours there was obtained 3.64 mols of 1,1-difluoroethane, boiling point —27° C. to —25° C., representing a 96% conversion.

Example III

Into a stainless steel horizontal tubular boiler ⁷⁄₁₆ of an inch diameter by 20 feet long, maintained at 22° C., was passed under a pressure of 73 to 77 lbs. per square inch a mixture of gaseous acetylene and boron trifluoride and liquid hydrogen fluoride at such a rate that the hydrogen fluoride:acetylene weight ratio was 1.6:1, the boron trifluoride:acetylene weight ratio was 0.52:1 and the contact time, defined as in Example I, was 20 seconds. After removal of the hydrogen fluoride and boron trifluoride with soda-lime, there was collected after seven hours operation a total of 1170 parts of crude 1,1-difluoroethane from which, upon distillation, there was obtained 1140 parts of pure 1,1-difluoroethane boiling at —26° C. This represents a 93% conversion.

Example IV

Into a one liter pressure reactor was charged 111 parts of substantially anhydrous hydrogen fluoride and sufficient boron trifluoride so that the boron trifluoride concentration was 30.1%. The reactor was rocked in an ice bath at 0° C. until the contents attained this temperature and was then pressured and repressured with acetylene to maintain a pressure of 100 lbs. per square inch. After two hours, the absorption of acetylene ceased and the contents of the container were bled through a soda-lime tower, a water scrubber, and a calcium chloride drying tower, and the product was collected by liquefaction. 182 parts of 1,1-difluoroethane, boiling point —27° C. to —25° C., were obtained, representing a quantitative conversion based on the hydrogen fluoride charged.

It will be understood that the foregoing examples are merely illustrative and the invention broadly comprises synthesizing 1,1-difluoroethane by reacting acetylene with hydrogen fluoride in the liquid phase in the presence of catalytic amounts of boron trifluoride under substantially anhydrous conditions.

Since the hydrogen fluoride must be in the liquid phase, it will be apparent that the conditions of temperature and pressure must be adjusted accordingly. It is preferred to employ a temperature between 0° C. and 30° C. and a pressure not in excess of 150 lbs. per square inch but a pressure up to 200 lbs. per square inch, which represents approximately the upper limit for safe handling of acetylene under pressure, and a temperature range between —20° C. and 65° C. may be employed. The reaction will take place at temperatures below —20° C. but the cost of refrigeration and the fact that the reaction rate gradually decreases as the temperature is lowered below 0° C. makes the use of lower temperatures impractical. Above 65° C. the disadvantages of using elevated temperatures and the increased vapor pressure of the liquid hydrogen fluoride offset any advantages to be derived even though the process is actually operative at higher temperatures.

The vapor pressure of liquid hydrogen fluoride is substantially equal to atmospheric pressure at 20° C., increases to 16 lbs. per square inch at 40° C., and to 45 lbs. per square inch at 65° C. Thus, in order to keep the hydrogen fluoride in the liquid phase at the mentioned temperatures, pressures at least equal to those indicated must be maintained. However, it has been found that the solubility of boron trifluoride in the liquid hydrogen fluoride is increased under pressure and therefore it is preferred to employ pressures somewhat higher than those indicated. A pressure of 5 lbs. to 150 lbs. above the vapor pressure of the liquid hydrogen fluoride at the temperature of operation is desirable and, preferably, a narrower range of 10 lbs. to 75 lbs. above the vapor pressure of the liquid hydrogen fluoride should be employed. This excess of pressure is desirable even at temperatures below 20° C. where the vapor pressure of the hydrogen fluoride does not exceed one atmosphere.

As the examples show, the process of this invention is not restricted to any particular apparatus or process technique in bringing the reactants together. The time of contact of the reactants may be varied widely and is, in part, a function of the method employed for dispersing the gaseous reactants in the liquid hydrogen fluoride. For example, the contact time in the continuous process where intimate and immediate contact is insured, may be one second or less. On the other hand, the time of contact may extend to three or four hours in the batch process and is dictated by considerations of economy since 1,1-difluoroethane appears to be entirely unaffected by hydrogen fluoride-boron trifluoride mixtures under the reaction conditions.

The quantity of boron trifluoride employed for the hydrofluorination of acetylene according to the present invention may be varied over considerable limits although for economical operation it is preferred to employ the lowest concentration that gives good conversions to 1,1-difluoroethane under the conditions of temperature and pressure used. About 10% of boron trifluoride in hydrogen fluoride is preferred although concentrations of 50% or even greater of boron trifluoride, by weight of the hydrogen fluoride, may be used. At concentrations below 10% the conversions fall off gradually and at below 1.0% the reaction rate is too low to be practical.

During the course of the hydrofluorination reaction, loss of boron trifluoride from the hydrogen fluoride-boron trifluoride mixture occurs slowly. Accordingly, sufficient boron trifluoride is added to maintain active hydrofluorinating conditions. The amount to be added varies according to the reactor design and the temperature and pressure used for the reaction. If desired, the boron trifluoride can be admixed with acetylene and the mixed gases injected into the hydrogen fluoride-boron trifluoride mixture. In carrying out a continuous process as in Example III, the problem of loss of boron trifluoride is not presented since the boron trifluoride is continuously introduced into the reactor along with the acetylene and hydrogen fluoride.

Inert solvents or diluents may also be employed in the process of this invention. Inert organic media such as 1,1-difluoroethane and selected fluorinated lower aliphatic hydrocarbons, increase the solubility of acetylene and assist in preventing localized overheating. Inert gases such as nitrogen can be employed as diluents for the acetylene and boron trifluoride fed into the reactor.

The process of this invention should normally be carried out under substantially anhydrous conditions for optimum results and, in fact, operativeness of the invention may be jeopardized if an appreciable amount of water were present. This means that it is advisable to use substantially anhydrous hydrogen fluoride and, preferably, the water content should be less than 1% by weight of the hydrogen fluoride. Hydrogen fluoride containing over 5%, by weight, of water definitely should not be used and, for practical purposes, hydrogen fluoride of a far lower water content would be desirable. Commercial anhydrous hydrogen fluoride usually has a water content of no more than 0.3% to 0.4% and is satisfactory. Specially distilled and purified hydrofluoric acid may be used but ordinarily the slight advantage gained does not warrant the increase in cost of this reactant.

1,1-difluoroethane is useful as an intermediate in the synthesis of polymerizable vinyl monomers such as vinyl fluoride which yield fluorine-containing polymers of excellent physical properties and unusual inertness. Other applications include the use of 1,1-difluoroethane as a refrigerant and as a low boiling solvent.

With a considerable demand for 1,1-difluoroethane, the outstanding advantage of the present invention is that it provides a highly practical and economical method of synthesizing 1,1-difluoroethane. A further advantage is that the process gives substantially quantitative conversions and yields of 1,1-difluoroethane. A still further advantage is that the process is fully adapted for large scale continuous operation without involving impractically delicate controls or conditions creating undue industrial hazards. A further advantage is that the catalyst employed in this process, boron trifluoride, may be recovered and used over again indefinitely.

As many apparently widely different embodiments of this invention may be made without departing from the spirit and scope thereof, it is to be understood that the invention is not limited to the specific embodiments thereof except as defined in the appended claims.

We claim:

1. Process of preparing 1,1-difluoroethane which comprises reacting acetylene with hydrogen fluoride in the liquid phase having dissolved therein at least 1.0% by weight of the hydrogen fluoride, of boron trifluoride, under substantially anhydrous conditions at a temperature of —20° C. to 65° C. and a pressure less than 200 lbs. per square inch.

2. Process of preparing 1,1-difluoroethane which comprises reacting acetylene with hydrogen fluoride in the liquid phase having dissolved therein at least 10.0%, by weight of the hydrogen fluoride, of boron trifluoride, under substantially anhydrous conditions at a temperature of 0° C. to 30° C. and a pressure less than 150 lbs. per square inch.

3. Process of preparing 1,1-difluoroethane which comprises reacting acetylene with hydrogen fluoride in the liquid phase having dissolved therein at least 1.0%, by weight of the hydrogen fluoride, of boron trifluoride, under substantially anhydrous conditions at a temperature of —20° C. to 65° C. and a pressure of 5 lbs. to 150 lbs. per square inch in excess of the vapor pressure of the liquid hydrogen fluoride at the temperature of operation.

4. Process of preparing 1,1-difluoroethane which comprises reacting acetylene with hydrogen fluoride in the liquid phase having dissolved therein at least 1.0%, by weight of hydrogen fluoride, of boron trifluoride, under substantially anhydrous conditions at a temperature of 0° C. to 30° C. and a pressure of 10 lbs. to 75 lbs. per square inch in excess of the vapor pressure of the liquid hydrogen fluoride at the temperature of operation.

5. Process of preparing 1,1-difluoroethane which comprises reacting acetylene with hydrogen fluoride in the liquid phase having dissolved therein at least 10.0%, by weight of hydrogen fluoride, or boron trifluoride, under substantially anhydrous conditions at a temperature of 0° C. to 30° C. and a pressure of 10 lbs. to 75 lbs. per square inch in excess of the vapor pressure of the liquid hydrogen fluoride at the temperature of operation.

6. Process of preparing 1,1-difluoroethane which comprises passing through a reaction zone maintained at a temperature of —20° C. to 65° C. a substantially anhydrous mixture of gaseous acetylene and liquid hydrogen fluoride having dissolved therein at least 1.0%, by weight of the hydrogen fluoride, of boron trifluoride, under a pressure of 5 lbs. to 150 lbs. per square inch in excess of the vapor pressure of liquid hydrogen fluoride at the temperature of the reaction zone.

7. Process of preparing 1,1-difluoroethane which comprises passing through a reaction zone maintained at a temperature of 0° C. to 30° C. a substantially anhydrous mixture of gaseous acetylene and liquid hydrogen fluoride having dissolved therein at least 10.0%, by weight of the hydrogen fluoride, of boron trifluoride, under der a pressure of 10 lbs. to 75 lbs. per square inch in excess of the vapor pressure of liquid hydrogen fluoride at the temperature of the reaction zone.

ROBERT E. BURK.
DONALD D. COFFMAN.
GEORGE H. KALB.

REFERENCES CITED

The following references are of record in the file of this patent:

UNITED STATES PATENTS

| Number | Name | Date |
|---|---|---|
| 2,118,901 | Soll | May 31, 1938 |
| 2,135,454 | McAlevy | Nov. 1, 1938 |
| 2,182,617 | Michel | Dec. 5, 1939 |
| 2,291,510 | Thomas et al. | July 28, 1942 |
| 2,324,073 | Gaylor et al. | July 13, 1943 |
| 2,186,916 | Wiezevich | Jan. 9, 1940 |

FOREIGN PATENTS

| Number | Country | Date |
|---|---|---|
| 307,802 | Great Britain | 1930 |

OTHER REFERENCES

Grosse et al., "J. A. C. S.," vol. 64, pp. 2289–2292 (1942).

Certificate of Correction

Patent No. 2,425,991. August 19, 1947.

ROBERT E. BURK ET AL.

It is hereby certified that error appears in the printed specification of the above numbered patent requiring correction as follows: Column 7, line 9, claim 7, strike out the syllable "der"; and that the said Letters Patent should be read with this correction therein that the same may conform to the record of the case in the Patent Office.

Signed and sealed this 7th day of October, A. D. 1947.

[SEAL]

THOMAS F. MURPHY,
*Assistant Commissioner of Patents.* fluoride at the temperature of the reaction zone.

7. Process of preparing 1,1-difluoroethane which comprises passing through a reaction zone maintained at a temperature of 0° C. to 30° C. a substantially anhydrous mixture of gaseous acetylene and liquid hydrogen fluoride having dissolved therein at least 10.0%, by weight of the hydrogen fluoride, of boron trifluoride, under der a pressure of 10 lbs. to 75 lbs. per square inch in excess of the vapor pressure of liquid hydrogen fluoride at the temperature of the reaction zone.

ROBERT E. BURK.
DONALD D. COFFMAN.
GEORGE H. KALB.

REFERENCES CITED

The following references are of record in the file of this patent:

UNITED STATES PATENTS

| Number | Name | Date |
|---|---|---|
| 2,118,901 | Soll | May 31, 1938 |
| 2,135,454 | McAlevy | Nov. 1, 1938 |
| 2,182,617 | Michel | Dec. 5, 1939 |
| 2,291,510 | Thomas et al. | July 28, 1942 |
| 2,324,073 | Gaylor et al. | July 13, 1943 |
| 2,186,916 | Wiezevich | Jan. 9, 1940 |

FOREIGN PATENTS

| Number | Country | Date |
|---|---|---|
| 307,802 | Great Britain | 1930 |

OTHER REFERENCES

Grosse et al., "J. A. C. S.," vol. 64, pp. 2289–2292 (1942).

Certificate of Correction

Patent No. 2,425,991.     August 19, 1947.

ROBERT E. BURK ET AL.

It is hereby certified that error appears in the printed specification of the above numbered patent requiring correction as follows: Column 7, line 9, claim 7, strike out the syllable "der"; and that the said Letters Patent should be read with this correction therein that the same may conform to the record of the case in the Patent Office.

Signed and sealed this 7th day of October, A. D. 1947.

[SEAL]

THOMAS F. MURPHY,
*Assistant Commissioner of Patents.*